United States Patent
Bayer et al.

[11] Patent Number: 5,390,893
[45] Date of Patent: Feb. 21, 1995

[54] MOUNTING FOR CYLINDERS AND DRUMS IN PRINTING MACHINES

[75] Inventors: Harald Bayer, Rodgau; Klemens Kemmerer, Seligenstadt, both of Germany

[73] Assignee: MAN Roland Druckmaschinen AG, Germany

[21] Appl. No.: 109,084

[22] Filed: Aug. 19, 1993

[30] Foreign Application Priority Data

Aug. 21, 1992 [DE] Germany ............................ 4227643

[51] Int. Cl.⁶ .............................................. F16M 1/00
[52] U.S. Cl. .................. 248/659; 100/155 R; 492/15
[58] Field of Search ............ 248/659; 492/15; 74/440, 421 R; 355/200; 100/155 R

[56] References Cited

U.S. PATENT DOCUMENTS

| | | | |
|---|---|---|---|
| 2,752,632 | 7/1956 | Winstead | 492/15 X |
| 3,889,334 | 6/1975 | Justus | 492/15 |
| 4,408,526 | 10/1983 | Mathes . | |
| 4,691,421 | 9/1987 | Schiel | 100/155 R |
| 4,829,842 | 5/1989 | Schiel | 74/421 R |
| 4,837,907 | 6/1989 | Roerig | 492/15 X |
| 4,883,369 | 11/1989 | Jude | 248/659 X |
| 4,910,842 | 3/1990 | Brendel | 100/162 B X |
| 4,962,577 | 10/1990 | Kubik | 492/15 X |
| 5,128,715 | 7/1992 | Furuyama | 355/200 |
| 5,132,728 | 7/1992 | Suzaki | 355/200 X |
| 5,174,002 | 12/1992 | Kusters | 492/15 |

FOREIGN PATENT DOCUMENTS

| | | |
|---|---|---|
| 674128 | 4/1939 | Germany . |
| 755282 | 8/1952 | Germany . |
| 1015452 | 9/1957 | Germany . |
| 2504149 | 7/1976 | Germany ................. 492/15 |
| 2507677 DE | 8/1976 | Germany ................. 492/15 |
| 3112503A1 DE | 10/1982 | Germany . |
| 3528846A1 | 4/1986 | Germany . |
| DE 278306A1 | 5/1990 | Germany . |

Primary Examiner—J. Franklin Foss
Attorney, Agent, or Firm—Leydig, Voit & Mayer, Ltd.

[57] ABSTRACT

An easy to assemble mounting for the cylinders and drums of printing machines is provided which at the same time reduces journal flexing and guarantees a high degree of rigidity in the drive wheel train. The stub journal of a cylinder is received in the collar of a driving wheel. The collar is rotatably supported in a bearing disposed in one of the press side walls and the collar is connected to the journal by means of connecting elements including a centering plate, locating pins and appropriate screws.

11 Claims, 1 Drawing Sheet

MOUNTING FOR CYLINDERS AND DRUMS IN PRINTING MACHINES

FIELD OF THE INVENTION

The present invention relates to a rotatable mounting for cylinders and drums in printing machines having a pair of spaced-apart side frames.

BACKGROUND OF THE INVENTION

A mounting of this general type is known, for example, from German Auslegeschrift 1,015,452.

DE 278,306 A1 describes a similar mounting which possesses a flange connected firmly to the frame. The flange receives the cylinder journal in a bearing. A further bearing is arranged on the flange and carries the driving wheel. The driving wheel is coupled to the cylinder journal via a coupling.

A bearing known from German Patent Specification 674,128 makes it possible for the cylinder to be easily exchangeable. Additional coupling members for releasable connection to the driving wheel are necessary on the cylinder journal.

German Patent Specification 755,282 discloses a cylinder mounting having a fully floating axle which carries the cylinder. The cylinder is flanged together with sleeves which are mounted in the frame wall and by which the fully floating axle is guided. The sleeve arranged on the drive side at the same time carries the driving wheel.

A further mounting is known from DE 3,528,846 A1. Here, the cylinder shaft is connected rigidly to the first frame wall. Furthermore, the cylinder shaft is received in a concentrically arranged bushing which is guided through rotatably via a bearing bore in the second frame wall. The bushing is connected to the cylinder on the end face and the free shaft end carries a driving wheel.

The above-mentioned solutions are primarily concerned with the improved assembly and dismounting of cylinders and drums in printing machines.

German Auslegeschrift 1,015,452 serves for reducing the flexion f the cylinder, but involves a high outlay in terms of assembly and dismounting. Differences in the bearing play of the bushing and ball bearing have an adverse effect.

An easy-to-assemble solution, which reduces the flexion and which guarantees the necessary rigidity in the wheel train, is thus not achieved, particularly where cylinders/drums of multiple size are concerned.

OBJECTS AND SUMMARY OF THE INVENTION

The object of the invention is, therefore, to eliminate the disadvantages mentioned above in the state of the art.

The object is achieved by providing an easy to assemble mounting for the cylinders and drums of printing machines which at the same time reduces journal flexing and guarantees a high degree of rigidity in the drive wheel train. The stub journal of a cylinder is received in the collar of a driving wheel. The collar is rotatably supported in a bearing disposed in one of the press side walls and the collar is connected to the journal by means of connecting elements including a centering plate, locating pins and appropriate screws.

The mounting according to the invention is suitable for printing machines both with a continuous and with an uncoupled wheel train. It can be used for cylinders or drums of multiple size, thus, for example, for cylinders of double size with a driving wheel of double size. As a result of the preferred arrangement as a fixed bearing on the drive side, the solution according to the invention brings about not only reduced flexion, but also especially high rigidity. The diameter ratio of cylinder journal to cylinder barrel can be made more favorable. The force flux or moment flux is improved by the direct mounting of the driving wheel in the frame.

The present mounting for cylinders or drums can be achieved by the use of plain or rolling bearings.

Because the axial length of the cylinder or drum is at most the clearance width between the frame walls plus double the frame thickness (first and second frame), the present solution is favorable for assembly. The use of short cylinder journals (stubs) makes it possible to assemble and dismount the cylinders and drums without swinging down the side-frame walls.

The solution according to the invention will be explained in more details by means of an exemplary embodiment.

These and other features and advantages of the invention will be more readily apparent upon reading the following description of a preferred exemplified embodiment of the invention and upon reference to the accompanying drawings wherein:

Figure 1:
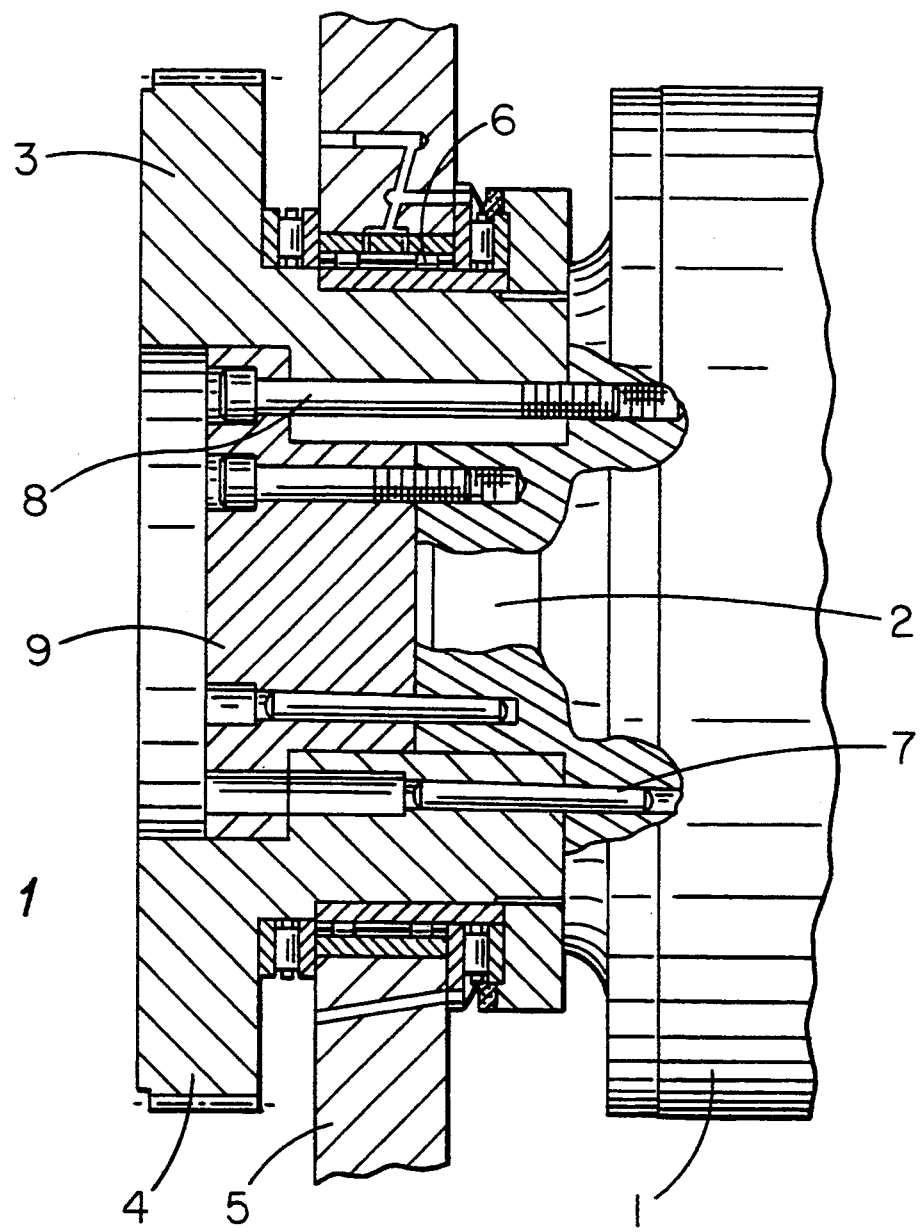
FIG. 1 is a fragmentary and partial sectional view of the cylinder mounting on the frame wall located on the drive side of a printing press.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Turning now to FIG. 1 in more detail, a portion of the drive end of a printing press cylinder 1 is shown. A short or stub journal 2 at the end of the cylinder 1 is received concentrically in the collar 3 of a driving gear or wheel 4. Pursuant to one aspect of the invention, the driving gear 4 and the integral collar 3 are formed with a passage bore for receiving the stub journal 2 at the end of the press cylinder. The collar 3 passes through a bore in one of a pair of side frames 5 of the printing press such that the driving gear 4 is disposed outside the press side wall for engagement by other gear elements in the press drive train.

According to the invention the collar 3 forms an integral unit with the driving wheel 4 and the collar 3 is rotatably supported in a bearing 6 disposed in the bore of the press side frame 5. In the illustrative embodiment, the bearing 6 is a relatively simple fixed bearing such as a radial roller bearing with two axial thrust roller bearings arranged respectively on the inside an on the outside of the frame wall 5.

In further accordance with the invention, from outside the press frame side wall 5, a centering plate 9 is disposed in the collar 3 on the end face of the journal 2 and is connected to the collar 3 and the journal 2 by means of pins 7 and screws 8. The centering plate 9 serves for positioning the cylinder 1 and for transmitting torque from the driving wheel to the cylinder 1.

It is another feature of the invention that the length of the cylinder, including the stub journal 2, corresponds to the clearance width between the spaced apart press frame walls 5 plus half the frame thickness per frame wall 5. In the second frame wall 5 on he press operator's side (not shown), the second journal 2 of the cylinder 1 is received in an axially movable journal bearing.

We claim as our invention:

1. Apparatus for rotatably mounting the driven end of a printing press cylinder in one of a pair of spaced apart press side frames comprising, in combination, a bearing and means defining an aperture in said one side frame for receiving and supporting said bearing in close-fitting relation therein, a driving gear having a hollow collar extending coaxially therefrom, said collar having inner and outer peripheral surfaces with said outer peripheral surface dimensioned for close-fitting insertion in and rotational support by said bearing, a journal on the driven end of said printing press cylinder, said journal dimensioned for close-fitting insertion in and support by said inner peripheral surface of said collar, and means for positively securing said collar to said journal, said securing means being selectively engageable and releasable.

2. Apparatus as defined in claim 1 wherein said cylinder has a journal at each end dimensioned for close-fitting insertion in and support by said inner peripheral surface of said collar and said securing means is selectively engageable and releasable from each of said journals.

3. Apparatus as defined in claim 2 wherein the axial length of said cylinder including said journals is not greater than the width between said side frames plus double said side frame thickness.

4. Apparatus as defined in claim 1, including a centering plate concentrically arranged within said collar of said driving gear and positively connected to said journal of said cylinder.

5. Apparatus as defined in claim 2 including a centering plate, said centering plate being concentrically arranged within said collar of said driving gear and being positively connected through said collar to either end of said cylinder.

6. Apparatus as defined in claim 1 wherein said bearing is a plain bearing.

7. Apparatus as defined in claim 1 wherein said bearing is a roller bearing.

8. Apparatus as defined in claim 4 including means for aligning said centering plate with said journal of said cylinder.

9. Apparatus as defined in claim 5 including means for aligning said centering plate with either end of said cylinder.

10. Apparatus as defined in claim 1 including axial thrust bearings mounted on said outer periphery of said collar, one on either side if said bearing.

11. Apparatus as defined in claim 10 including a thrust ring coaxially surrounding said outer periphery of said collar and interposed between the end of said cylinder and the inner one of said axially thrust bearings.

* * * * *